(12) United States Patent
Chesnes et al.

(10) Patent No.: US 6,454,885 B1
(45) Date of Patent: Sep. 24, 2002

(54) NICKEL DIFFUSION BRAZE ALLOY AND METHOD FOR REPAIR OF SUPERALLOYS

(75) Inventors: Richard Patrick Chesnes, Cincinnati, OH (US); Raymond Ruiwen Xu, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 09/737,901

(22) Filed: Dec. 15, 2000

(51) Int. Cl.[7] .............................................. C22C 19/05
(52) U.S. Cl. ..................... 148/528; 75/255; 228/262.31
(58) Field of Search ........................... 75/255; 420/445; 148/528; 228/262.31

(56) References Cited

U.S. PATENT DOCUMENTS

| | | |
|---|---|---|
| 4,169,742 A | 10/1979 | Wukusick et al. |
| 4,381,944 A * | 5/1983 | Smith et al. ................... 75/255 |
| 4,493,451 A | 1/1985 | Clark et al. |
| 4,719,080 A | 1/1988 | Duhl et al. |
| 4,830,934 A | 5/1989 | Ferrigno et al. |
| 4,842,953 A | 6/1989 | Perkins et al. |
| 4,979,995 A | 12/1990 | Hattori et al. |
| 5,077,004 A | 12/1991 | Schweizer et al. |
| 5,098,470 A | 3/1992 | Wood et al. |
| 5,173,255 A | 12/1992 | Ross et al. |
| 5,240,491 A | 8/1993 | Budinger et al. |
| 5,240,518 A | 8/1993 | Wortman et al. |
| 5,270,123 A | 12/1993 | Walston et al. |
| 5,374,319 A | 12/1994 | Stueber et al. |
| 5,449,490 A | 9/1995 | Kondo et al. |
| 5,489,346 A | 2/1996 | Erickson |
| 5,666,643 A | 9/1997 | Chesnes et al. |
| 5,882,586 A | 3/1999 | Tamura et al. |

* cited by examiner

*Primary Examiner*—George Wyszomierski
(74) *Attorney, Agent, or Firm*—Woodard, Emhardt, Naughton Moriarty & McNett

(57) ABSTRACT

A braze alloy powder mixture that includes a low-melt powder composition and a high-melt powder composition. The low-melt powder composition is made of one or more low-melt powders and includes 50–70% Ni, 8–20% Cr, 8–15% Ta, 4–10% Co, 2–7% Al, and up to 2.25% B. The high-melt powder composition is made of one or more high-melt powders and includes 50–70% Ni, 2–10% Cr, 2–10% Ta, 5–15% Co, 2–10% Al, 2–10% W, and up to about 3% each of Re, Mo and Hf. Up to about 1% Ti, W, Mo, Re, Nb, Hf, Pd, Pt, Ir, Ru, C, Si, and/or Zr may be included in the low-melt powder, while the high-melt powder may include up to about 1% each of Ti, Nb, C, B, Si, and Zr.

17 Claims, 8 Drawing Sheets

Trailing edge sides of vane segment prior to and after braze repair.

Leading edge sides of vane segment prior to and after braze repair.

Trailing edge sides of vane segment prior to and after braze repair.

NICKEL DIFFUSION BRAZE ALLOY AND METHOD FOR REPAIR OF SUPERALLOYS

The present invention relates generally to compositions and methods for repairing superalloys, and more particularly to compositions and methods for the braze repair of nickel- and/or cobalt-based superalloy parts.

BACKGROUND OF THE INVENTION

Nickel- and/or cobalt-based superalloys are commonly used by the aerospace and power industries for components such as turbine vanes that will be subjected to high temperatures and stress. While such alloys are inherently strong and resistant to damage, cracks and ruptures occasionally occur. When the damage is relatively minor, repairs can be made, such as, for example, by braze repair.

High temperature diffusion braze technology is normally used to repair turbine vanes made of Ni- and Co-based superalloys. The braze alloy mixture typically includes two powdered constituents. The first constituent (the base metal powder) is a high temperature powder with a chemistry the same as, or similar to, the component being repaired. The second constituent (the braze alloy powder) consists of a high temperature diffusion braze alloy that has a melting temperature well below that of the base metal powder. This braze alloy powder is used to join the base metal powder particles together, and to join the composite powder mixture to the areas of the component being repaired.

Diffusion braze alloy powders typically contain melting point depressants such as boron and/or silicon of elements. Unfortunately though, the use of boron and silicon in braze alloys can have a negative impact on the mechanical and/or environmental properties of the repaired area of the part. In particular, large, blocky or script-like brittle phases are formed which decrease the ability of the material to resist rupture from stress. These brittle phases are composed of refractory elements, chromium, and/or titanium combined with boron, silicon and carbon. For the braze repair of directional solidified (DS) superalloys with columnar-grained (CG) and single-crystal (SC) microstructure, B and Si are particularly detrimental to the mechanical properties and oxidation resistance.

A need therefore exists for improved braze repair alloy powders with minimal amounts of B and/or Si, that can be used for repairing superalloys such as those found in jet engine turbine vanes. The present invention addresses that need.

SUMMARY OF THE INVENTION

Briefly describing one aspect of the present invention, there is provided a braze alloy powder mixture comprising a low-melt powder composition and a high-melt powder composition. The low-melt powder composition may be made from a single low-melt alloy powder, or it may be a mixture of more than one low-melt alloy powder. In either event, the low-melt powder composition preferably comprises, by weight, 50–70% Ni, 8–20% Cr, 8–15% Ta, 4–10% Co, 2–7% Al, and up to about 2.25% B. Similarly, the high-melt powder composition may be made from a single high-melt alloy powder, or it may be a mixture of more than one high-melt alloy powder. In either event, the high-melt powder composition preferably comprises, by weight, 50–70% Ni, 2–10% Cr, 2–10% Ta, 5–15% Co, 2–10% Al, 2–10% W, and up to about 3% each Re, Mo and/or Hf.

In the most preferred embodiments the low-melt powder composition also comprises up to about 1% each of any or all of the following: Ti, W, Mo, Re, Nb, Hf, Pd, Pt, Ir, Ru, C, Si, and Zr, and the high-melt powder composition also comprises up to about 1% each of any or all of the following: Ti, Nb, C, B, Si, and Zr.

Accordingly, the braze alloy mixture (that is, the combination of low-melt and high-melt powders) preferably comprises 50–70% Ni, 10–15% Cr, 8–10% Ta, 8–10% Co, 4–7% Al, 2–4% W, about 1–2% Re, and about 0.5–1% each of Mo and Hf. In the most preferred embodiments the braze alloy mixture also comprises up to about 1% each of any or all of the following: Ti, Nb, Pd, Pt, Ir, Ru, C, B, Si, and Zr.

One object of the present invention is to provide braze alloy powders useful for the braze repair of Ni- and/or Co-based superalloys.

Other objects and advantages will be apparent from the following description.

DESCRIPTION OF THE PREFERRED EMBODIMENTS

Figure 1:
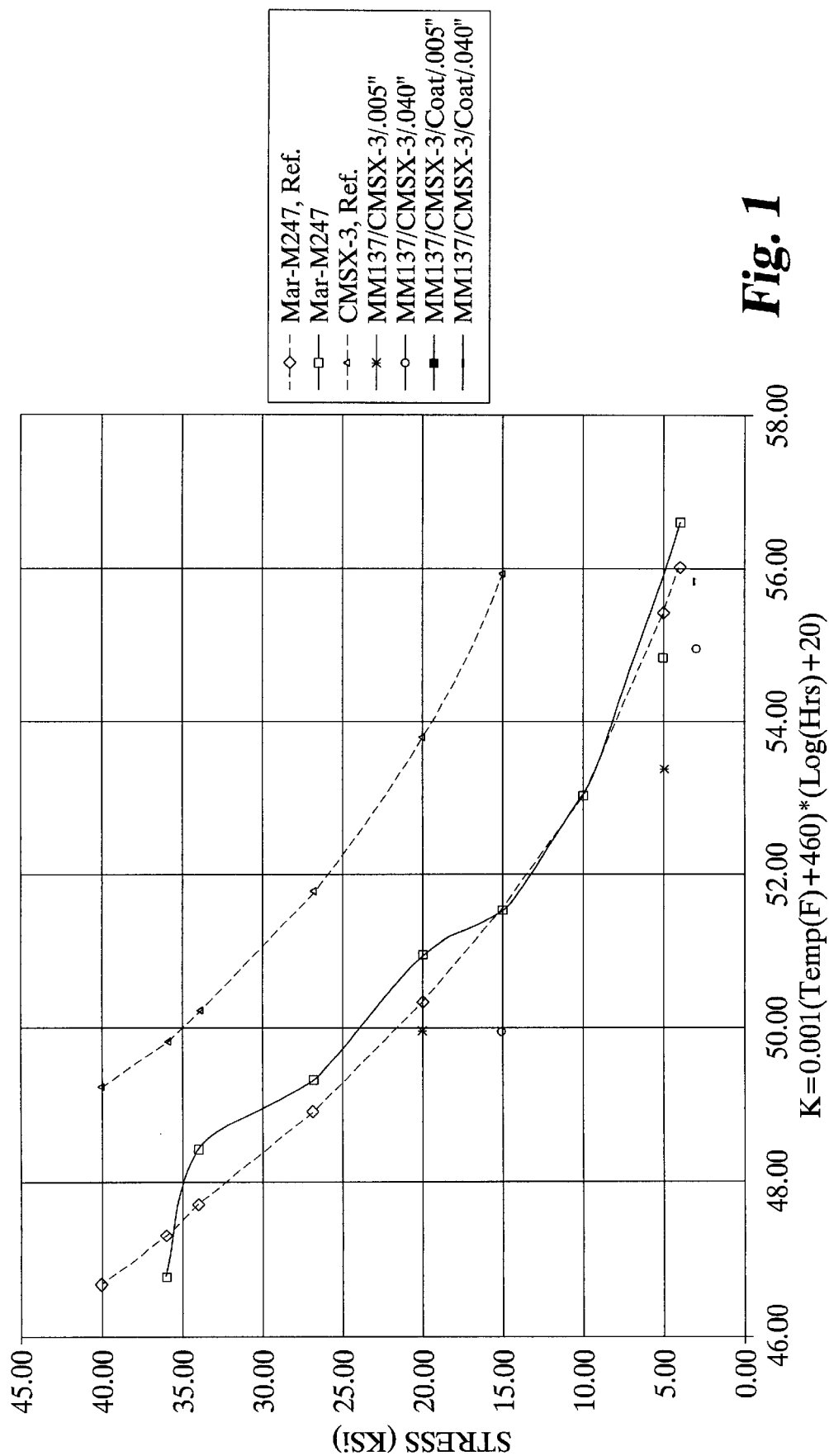
FIG. 1 is a graph showing the results of a stress rupture test performed on an article repaired with the inventive braze repair alloy powders of one preferred embodiment of the present invention.

For the purposes of promoting an understanding of the principles of the invention, reference will now be made to certain preferred embodiments and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As indicated above, one aspect of the present invention relates to powders useful for the braze repair of superalloy components such as turbine vanes. In a preferred embodiment one or more low-melt alloy powders is mixed with one or more high-melt alloy powders to form a powdered braze alloy mixture that can be used for the repair.

Another aspect of the invention relates to methods of repairing superalloy components by using the subject braze alloy mixtures at braze temperatures of about 2300° F., followed by a stepped, diffusion heat treatment cycle at temperatures ranging from about 1900° F. to about 2100° F.

1. Substrates

The braze repair compositions and methods of the present invention can be used to repair a wide variety of substrates, including nickel- or cobalt-based alloy substrates. Specific examples of alloys that can be repaired with the compositions and methods of the present invention include, but are not limited to: nickel-based alloys such as Mar-M246, Mar-M247; single crystal nickel alloys such as CMSX-3, CMSX-4, and CM-186; and cobalt-based alloys such as Mar-M509 and X40.

2. Braze Alloy Powders, and Mixtures Thereof

The braze alloy powder mixtures of the present invention include both a low-melt powder composition and a high-melt powder composition. The low-melt alloy powder composition is an alloy, or a mixture of alloys, that substantially melts below the braze temperature (hence the name "low-melt"). In contrast, the high-melt alloy powder composition is an alloy, or a mixture of alloys, that remains substantially unmelted at braze temperatures because the composition has a melting temperature above the braze temperature (hence the name "high-melt").

In the preferred embodiments of braze repair mixtures used to repair Ni-based superalloys such as MAR-M247 or CMSX-3, the low-melt powder composition is preferably made from a mixture of alloys that melt below about 2250° F., with the combination of alloys being selected so that the low-melt powder composition as a whole substantially melts in the range of about 2100° F. +/−100° F. The high-melt alloy powder composition used in such embodiments is preferably made of a single high-melt alloy that doesn't melt until it gets above about 2400° F.

In the most preferred embodiments the low-melt powder composition accordingly comprises one or more alloy powders and has a resulting composition of about 50–70% Ni, 8–20% Cr, 8–15% Ta, 4–10% Co, 2–7% Al, and up to about 2.25% B and/or Si, by weight, and has a compositional melting range of between about 2000° F. and 2250° F. In certain preferred embodiments the low-melt powder composition also comprises up to about 1% each of any or all of the following: Ti, W, Mo, Re, Nb, Hf, Pd, Pt, Ir, Ru, C, and Zr.

Most preferably, the alloys used to prepare the low-melt alloy powders each contain between about 0.65 and about 2.25% B, with the total amount of B in the low-melt powder composition preferably being between about 1% and 2%. The low-melt alloy powders each also preferably contain up to about 3% Si, with the total amount of Si in the low-melt powder preferably being between about 0.5% and 1%.

The high-melt powder composition preferably is an alloy (or mixture of alloys) with a chemistry that is the same or substantially the same as the alloy in the substrate to be repaired. Accordingly, to repair Ni-based superalloy components such as those made of MAR-M246 or 247, or CMSX-3 or -4, the high-melt powder composition typically comprises about 50–70% Ni, 2–10% Cr, 2–10% Ta, 5–15% Co, 2–10% Al, 2–10% W, 2–4% Re, and up to about 3% each of Mo and Hf. In the most preferred embodiments the high-melt powder composition also comprises up to about 1% each of any or all of the following: Ti, Nb, C, B, Si, and Zr.

The low-melt alloy composition and the high-melt alloy composition are generally combined at ratios of about 1:3 to about 3:1 low-melt:high-melt powder, with ratios of 1:2 to 2:1 being more preferred. In the most preferred embodiments, the ratio of low-melt powder to high-melt powder is typically in the range of 1:1 to 1:1.5.

In testing to date, compositions comprising about 40–50% low-melt alloy powder, and about 50–60% high-melt powder has been preferred for repairing Ni-based superalloy parts such as vanes made of CMSX-3. A ratio of about 45:55 low-melt:high-melt powders has been most preferred for those Ni-based superalloy repairs.

In selecting the proportions of components used in the invention, it should be recognized that higher weight percentages of high-melt powder typically provide better mechanical properties in view of their reduced levels of boron and/or silicon. Similarly, higher percentages of low-melt powders typically have improved braze flow. As can be appreciated by persons skilled in the art, a proper balance between mechanical properties and braze flow must be established, as dictated by the demands of a particular application.

Higher Al content is also desired in some embodiments because Al-rich compositions improve high-temperature oxidation properties. Further, increasing the Ta content in the mixtures improves the braze joint mechanical properties. In particular, Ta additions strengthen the gamma and gamma prime phases by increasing lattice mismatches.

In view of the above, it can be seen that the final braze alloy repair mixture preferably comprises 50–70% Ni, 10–15% Cr, 8–10% Ta, 8–10% Co, 4–7% Al, 2–4% W, 1–2% Re, and about 1% each of Mo and Hf, and most preferably also comprises up to about 1% each of any or all of the following: Ti, Nb, Pd, Pt, Ir, Ru, C, B, Si, and Zr.

As indicated above, in certain preferred embodiments the low-melt alloy powder comprises a mixture of two or more low-melt alloys. In one preferred embodiment particularly useful for repairing Ni-based superalloy parts, the low-melt alloy powder comprises: (a) about 35% of a first low-melt powder comprising about 74% Ni, about 6% Cr, about 6% Al, about 12% Co, and about 2% B, with a liquidus temperature of about 2050° F.; (b) about 45% of a second low-melt powder comprising about 42% Ni, about 31% Cr, about 26% Ta, and about 1% B, with a liquidus temperature of about 2250° F.; and (c) about 20% of a third low-melt powder comprising about 64% Ni, about 6% Al, about 8% Co, about 4% W, about 4% Ta, about 3% Si, about 1% Re, about 1% Nb, and about 1% B, with a liquidus temperature of about 2000° F.

In one preferred embodiment the high-melt powder composition comprises about 55–60% Ni, about 7% Cr, about 6% Ta, about 12% Co, about 6% Al, about 3% Re, about 1.5% Hf, and about 5% W.

Table 1 below shows the compositions, by weight %, of three potential low-melt alloys (ADB-01, ADB-02, and ADB-03) and one potential high-melt alloy (HMA-01). In the most preferred embodiments these alloys are combined such that the low-melt alloy powder comprises about 35% ADB-01, about 45% ADB-02, and about 20% ADB-03. One preferred braze repair powder comprises 45% of this mixture of low-melt powders, and 55% of this preferred high-melt powder.

Table 2 below shows other low-melt and high-melt alloy powders that may be used in the present invention. (It is to be appreciated that Table 2 is for illustrative purposes, and that not all low-melt or high-melt powders are shown in Table 2.) Table 3 shows braze repair alloy mixtures of those low-melt and high-melt alloy powders. (It is also to be appreciated that Table 3 is for illustrative purposes, and that not all mixtures of low-melt and high-melt powders are shown in Table 3.)

TABLE 1

BRAZE ALLOY COMPOSITIONS
by weight percent

| Alloy | Ni | Cr | Al | Ti | Co | W | Mo | Re | Te | Nb | Hf |
|---|---|---|---|---|---|---|---|---|---|---|---|
| ADB-01 | BAL. | 5.75–6.25 | 6.15–6.35 | .01 max | 11.25–12.25 | .01 max | .01 max | .01 max | .01 max | .01 max | .01 max |
| ADB-02 | BAL. | 30.8–31.2 | .01 max | .01 max | .05 max | .01 max | .01 max | .01 max | 25.8–26.2 | .01 max | .01 max |
| ADB-03 | BAL. | 5.9–6.10 | 6.15–6.35 | .01 max | 7.75–8.25 | 3.25–3.75 | .01 max | 1.00–1.50 | 4.00–4.50 | 1.00–1.50 | 0.40–0.60 |
| HMA-01 | BAL. | 6.60–7.00 | 5.94–6.30 | 0.02 max | 11.45–12.05 | 4.70–5.10 | 1.30–1.70 | 2.60–3.00 | 6.20–6.50 | 0.10 max | 1.30–1.70 |

| Alloy | C | B | Si | Pd | Pi | Zr | Ir | Ru | Y | La | ***Ce |
|---|---|---|---|---|---|---|---|---|---|---|---|
| ADB-01 | **.02 max | 2.00–2.25 | .05 max | .01 max | .01 max | .01 max | .01 max | .01 max | .005 max | .005 max | .005 max |
| ADB-02 | **.02 max | .85–1.15 | .05 max | .01 max | .01 max | .01 max | .01 max | .01 max | .005 max | .005 max | .005 max |
| ADB-03 | **.02 max | 1.20–1.40 | 2.75–3.25 | .005 max | .005 max | .005 max | .01 max | .01 max | .005 max | .005 max | .005 max |
| HMA-01 | .10–.14 | .01–.02 | .06 max | | .30 max | .030 max | | | | | |

| Alloy | Mn | O | S | P | Fe | V | Cu | Mg | N |
|---|---|---|---|---|---|---|---|---|---|
| ADB-01 | .01 max | #.0300 max | .0010 max | .015 max | .1 max | .1 max | .1 max | .01 max | .0300 max |
| ADB-02 | .01 max | #.0300 max | .0010 max | .015 max | .1 max | .1 max | .1 max | .01 max | .0330 max |
| ADB-03 | .01 max | .0100 max | .0002 max | .015 max | .1 max | .1 max | .1 max | .01 max | .0300 max |
| HMA-01 | .01 max | #.0300 max | .0040 max | .010 max | .1 max | .2 max | .1 max | .0035 max | |

TABLE 2

BRAZE ALLOY COMPOSITIONS
try weight percent

| ALLOY | Ni | Cr | Al | Ti | Co | W | Mo | Re | Te | Nb |
|---|---|---|---|---|---|---|---|---|---|---|
| ADB-101 | BAL. | 6.75–7.25 | 4.75–5.25 | .01 max | 0.75–11.25 | 1.75–2.25 | .01 max | .01 max | 7.75–6.25 | .10 max |
| ADB-102 | BAL. | 6.25–6.75 | 4.75–5.25 | .01 max | 9.75–0.25 | 1.0–1.5 | .01 max | 0.3–0.05 | 9.75–10.25 | .4–.8 |
| ADB-103 | BAL. | 6.25–6.75 | 4.75–5.25 | .01 max | 0.15–11.25 | 1.75–2.25 | .01 max | .01 max | 10.75–11.25 | .10 max |
| ADB-104 | BAL. | 6.25–6.75 | 4.75–5.25 | .01 max | 11.25–12.25 | 1.25–1.75 | .01 max | .01 max | 10.75–11.25 | .10 max |
| ADB-106 | BAL. | 6.25–6.75 | 6.15–6.35 | .01 max | 11.25–12.25 | .01 max | .01 max | .01 max | 62.5–6.50 | .10 max |
| ADB-01 | BAL. | 5.75–6.25 | 6.15–6.35 | .01 max | 11.25–12.25 | .01 max | .01 max | .01 max | .01 max | .01 max |
| ADB-108 | BAL. | .01 max | 54.75–55.25 | .06 max | .05 max | .01 max | .01 max | .01 max | .01 max | .01 max |
| ADB-02 | BAL. | 30.8–31.2 | .01 max | .06 max | .05 max | .01 max | .01 max | .01 max | 25.8–28.2 | .01 max |
| ADB-110 | .05 max | .01 max | .01 max | .01 max | BAL. | .01 max | .01 max | .01 max | 29.8–30.2 | .01 max |
| ADB-111 | BAL. | 6.25–6.75 | 6.15–6.35 | .01 max | 1.25–12.25 | .01 max | .01 max | .01 max | 6.25–6.50 | .01 max |
| ADB-03 | BAL. | 5.9–6.10 | 6.15–6.35 | .01 max | 7.75625 | 3.25–3.75 | .01 max | 1.00–1.50 | 4.00–4.50 | 1.00–1.50 |
| ADB-114 | BAL | .01 max | .01 max | .01 max | .01 max | .01 max | .01 max | .01 max | .01 max | .01 max |
| RCT-4 | BAL. | 6 | | | 6 | 4 | 2 | | 4 | 2 |

| ALLOY | Hf | Pd | Pi | Ir | Ru | C | B | Si | Zr | Y | La | ***Ce |
|---|---|---|---|---|---|---|---|---|---|---|---|---|
| ADB-101 | .1 max | 27.5–3.25 | .055 max | .01 max | .01 max | .08–.12 | .45–.55 | 5.0–5.5 | .005 max | .005 max | .005 max | .005 max |
| ADB-102 | .01 max | .25–.75 | .25–.75 | .01 max | .01 max | .01 max | 1.0–1.25 | 3.0–3.5 | .005 max | .005 max | .005 max | .005 max |
| ADB-103 | .01 max | .005 max | .005 max | .01 max | .01 max | .08–.12 | .45–.55 | 5.5–6.0 | .005 max | .005 max | .005 max | .005 max |
| ADB-104 | 0.8–1.2 | 5.75–6.25 | .005 max | .01 max | .01 max | .04–.08 | 1.20–1.50 | 3.25–3.75 | .005 max | .005 max | .005 max | .005 max |
| ADB-106 | .01 max | .25–.75 | .005 max | .01 max | .01 max | **.02 max | 2.40–2.60 | .05 max | .01 max | .005 max | .005 max | .005 max |
| ADB-01 | .01 max | .01 max | .01 max | .01 max | .01 max | **.02 max | 2.00–2.25 | .05 max | .01 max | .005 max | .005 max | .005 max |
| ADB-108 | .01 max | .01 max | .01 max | .01 max | .01 max | **.02 max | .01 max | .05 max | .01 max | .005 max | .005 max | .005 max |
| ADB-02 | .01 max | .01 max | .01 max | .01 max | .01 max | **.02 max | .85–1.15 | .05 max | .01 max | .005 max | .005 max | .005 max |
| ADB-110 | .01 max | .01 max | .01 max | .01 max | .01 max | **.02 max | 1.60–0.80 | .05 max | .005 max | .005 max | .005 max | .005 max |
| ADB-111 | .01 max | .01 max | .005 max | .01 max | .01 max | .02–.04 | .01 max | .05 max | .005 max | .005 max | .005 max | .005 max |
| ADB-03 | 0.40–0.50 | .005 max | .005 max | .01 max | .01 max | **.02 max | 1.20–1.40 | 2.75–3.25 | .005 max | .005 max | .005 max | .005 max |
| ADB-114 | .01 max | 59.5–60.5 | .01 max | .01 max | .01 max | .02–.04 | .01 max | .05 max | .005 max | | | |

| ALLOY | Mn | O | S | P | Fe | V | Cu | Mg | N |
|---|---|---|---|---|---|---|---|---|---|
| ADB-101 | .01 max | .0100 max | .0002 max | .015 max | .1 max | .1 max | .1 max | .01 max | .0300 max |
| ADB-102 | .01 max | .0100 max | .0002 max | .015 max | .1 max | .1 max | .1 max | .01 max | .0300 max |
| ADB-103 | .01 max | .0100 max | .0002 max | .015 max | .1 max | .1 max | .1 max | .01 max | .0300 max |
| ADB-104 | .01 max | .0100 max | .0002 max | .015 max | .1 max | .1 max | .1 max | .01 max | .0300 max |
| ADB-106 | .01 max | #.0300 max | #.0010 max | .015 max | .1 max | .1 max | .1 max | .01 max | .0300 max |
| ADB-01 | .01 max | #.0300 max | #.0010 max | .015 max | .1 max | .1 max | .1 max | .01 max | .0300 max |
| ADB-108 | .01 max | #.0300 max | #.0010 max | .015 max | .1 max | .1 max | .1 max | .01 max | .0300 max |
| ADB-02 | .01 max | #.0300 max | #.0010 max | .015 max | .1 max | .1 max | .1 max | .01 max | .0300 max |

TABLE 2-continued

BRAZE ALLOY COMPOSITIONS
try weight percent

| | | | | | | | | | |
|---|---|---|---|---|---|---|---|---|---|
| ADB-110 | .01 max | #.0300 max | #.0010 max | .015 max | .1 max | .1 max | .1 max | .01 max | .0300 max |
| ADB-111 | .01 max | #.0300 max | #.0010 max | .015 max | .1 max | .1 max | .1 max | .01 max | .0300 max |
| ADB-03 | .01 max | .0100 max | .0002 max | .015 max | .1 max | .1 max | .1 max | .01 max | .0300 max |
| ADB-114 | .01 max | #.0360 max | #.0010 max | .015 max | .1 max | .1 max | .1 max | .01 max | .0300 max |

TABLE 3

BRAZE ALLOY MIXTURES AND TEST NOTES

| Mixture # | Alloy Mixture | Comments |
|---|---|---|
| MM–29 | Mar-M247/ADB-03 50/50 | Alloy densified. Bright shiny silver surface. Good wet–out. 100% slot fill. |
| MM–36 | Mar-M247/ADB-03/ADB-106 40/30/30 | Alloy densified. Bright shiny silver surface. Good wet–out. 100% slot fill. |
| MM–37 | 247/ADB-03/AMS4782 40/40/20 | Alloy densified. Bright shiny silver surface. Good wet–out. 100% slot fill. |
| MM–39 | Mar-M247/ADB-03/ADB-104 40/30/30 | Alloy densified. Bright shiny silver surface. Good wet–out. 100% slot fill. |
| MM–45 | Mar-M247/SXCX-4/ADB-03/ADB-104 20/20/30/30 | Alloy densified. Bright shiny silver surface. Good wet–out. 100% slot fill. |
| MM–47 | MAR–M247/ADB-03 40/60 | Alloy densified. Bright shiny silver surface. Good wet–out. 100% slot fill. |
| MM–51 | Mar-M247/ADB-03/ADB-114 60/20/20 | Less slot fill than MM–50. |
| MM–52 | Mar-M247/ADB-03/ADB-114 40/35/25 | Alloy densified. Bright shiny silver surface. Excellent wet–out. 100% slot fill. |
| MM–69 | Mar-M247/ADB-02 40/60 | Excellent flow and complete slot fill. |
| MM–70 | Mar-M247/ADB-02/ADB-114 50/40/10 | Excellent flow and complete slot fill. |
| MM–72 | Mar-M247/ADB-02/ADB-03 50/40/10 | Excellent flow and complete slot fill. |
| MM–73 | Mar-M247/ADB-02/B–28 50/40/10 | Excellent flow and complete slot fill. |
| MM–74 | Mar-M247/ADB-02/B–28/ADB-114 50/35/10/5 | Excellent flow and complete slot fill. |
| MM–75 | Mar-M247/ADB-02/ADB-03/ADB-114 50/35/10/5 | Excellent flow and complete slot fill. |
| MM–106 | Mar-M247/ADB-01/ADB-02 50/40/10 | Excellent flow and complete slot fill. |
| MM–122 | HMA-01/ADB-01/ADB-02 50/30/20 | RX in SX–3 near braze; Excellent flow and complete slot fill. |
| MM–123 | HMA-01/RCT–4/ADB-02 50/30/20 | Excellent flow and complete slot fill. |
| MM–124 | HMA-01/ADB-01/ADB-02 50/20/30 | Excellent flow and complete slot fill. |
| MM–127 | HMA-01/ADB-01/ADB-2 60/20/20 | Sluggish flow and complete slot fill. 5–10% voids in bead |
| MM–128 | HMA-01/ADB-01/ADB-02 60/30/10 | Excellent flow and complete slot fill. 100% RX in SX–3 interface. |
| MM–129 | HMA-01/ADB-01/ADB-02 60/10/30 | Sluggish flow and complete slot fill. A lot voids in bead. |
| MM–130 | HMA-01/ADB-01/ADB-02 65/25/10 | Excellent flow and complete slot fill. 100% RX in SX–3 interface. |
| MM–131 | HMA-01/ADB-01/ADB-02 60/25/15 | Excellent flow and complete slot fill. 100% RX in SX–3 interface. |
| MM–133 | HMA-01/ADB-01 60/40 | Excellent flow and complete slot fill. |
| MM–135 | HMA-01/ADB-01 70/30 | Excellent flow and complete slot fill. |
| MM–136 | HMA-01/ADB-01/ADB-02/ADB-03 50/15/20/15 | Excellent flow and complete slot fill. |
| MM–137 | HMA-01/ADB-01/ADB-02/ADB-03 55/15/20/10 | Excellent flow and complete slot fill. |
| MM–140 | HMA-01/ADB-03 60/40 | Excellent flow and complete slot fill. |
| MM–141 | HMA-01/ADB-106/ADB-03 60/20/20 | Excellent flow and complete slot fill. |
| MM–142 | HMA-01/RCT-4/ADB-02 60/20/20 | Excellent flow and complete slot fill. |
| MM–143 | HMA-01/RCT-4/ADB-02 60/30/10 | Good flow and complete slot fill. |
| MM–144 | HMA-01/RCT-4/ADB-02 60/35/5 | Good flow and complete slot fill. |
| MM–145 | HMA-01/RCT-12/ADB-110 60/30/10 | Excellent flow and complete slot fill. |

3. Methods of Use

The following steps are typical for the braze repair processes of the present invention. It is to be appreciated that certain steps may be adjusted, or even omitted, depending on the nature of the component being repaired.

The first steps normally involve the inspection and cleaning of the component. Initially, chemical and mechanical cleaning processes are generally used to remove dirt, debris, grease, oils, and loose scale from the component. Following that, chemical stripping may be required to remove any coatings that may be present. Then, fluoride ion cleaning (FIC) may need to be used to remove complex oxides from the surface and from inside cracks. Finally, high-temperature vacuum cleaning may be required to remove residual oxides and fluoride ions from the FIC process. All of these methods are generally known to the art, and can be incorporated into the inventive process on an "as needed" basis without undue experimentation.

Following cleaning, the high temperature braze repair is begun. In that process, the braze repair alloy powder is made into a slurry (preferably using a binder effective to hold the powders together and to help hold the powders on the surface being repaired) and is applied to the surface. The component is then heated in a vacuum or in an inert gas to a temperature effective to melt the low-melt alloy so that the braze material fills the crack being repaired. In the preferred embodiments the braze temperature is between 2150° F. and 2350° F., with braze temperatures of about 2300° F. being most preferred. The braze time may vary from about 10 minutes to about 40 minutes, with braze times of about 20 to 30 minutes being most commonly used.

Following the brazing itself, the component is subjected to a diffusion heat treatment cycle to homogenize the repaired region. The diffusion heat treatment is preferably performed at temperatures 0–400° F. below the braze temperature, and for times of up to about 24 hours. A vacuum or inert atmosphere is preferably used for the diffusion heat treatment.

In certain preferred embodiments the heat diffusion cycle is performed for a time and at temperatures effective to break down the script-like silicide phases into fine discrete particles. The cycle also preferably is performed for a time and at temperatures effective to reduce the size and quantity of brittle boride phases.

In one preferred embodiment the diffusion cycle is a stepped heat cycle, as follows:

a. Heat part to 1800–2000° F. and hold for 0.5–4 hours;
b. Heat part to 1900–2100° F. and hold for 1–4 hours;
c. Heat part to 1950–2150° F. and hold for 1–4 hours;
d. Heat part to 2000–2200° F. and hold for 6 to 24 hours; and
e. Cool to ambient temperature.

The heating is preferably accomplished at a rate such that the first heating step is performed at a rate of about 20–40° F. per minute, the second heating step is performed at a rate of about 10–30° F. per minute, the third heating step is performed at a rate of about 5–20° F. per minute, the fourth heating step is performed at a rate of about 5–20° F. per minute.

In the most preferred embodiment the diffusion cycle is a stepped heat cycle, as follows:

a. Heat part to about 1900° F. at about 30° F. per minute and hold for 1 hour;
b. Heat part to about 2000° F. at about 20° F. per minute and hold for 2 hours;
c. Heat part to about 2050° F. at about 10° F. per minute and hold for 2 hours;
d. Heat part to about 2100° F. at about 10° F. per minute and hold for 8 to 18 hours;
e. Vacuum or inert gas furnace cool to about 1200° F. at a rate which is slow enough to avoid thermal distortion; and
f. Inert gas fan cool to about 150° F. or less.

Reference will now be made to specific examples using the processes described above. It is to be understood that the examples are provided to more completely describe preferred embodiments, and that no limitation to the scope of the invention is intended thereby.

EXAMPLE 1
Braze Alloy Repair

A braze repair alloy mixture is prepared by combining: (a) about 15% of a first low-melt alloy powder comprising 5.75–6.25% Cr, 6.15–6.35% Al, 11.25–12.25% Co, 2–2.25% B, and the balance Ni (with only trace amounts (i.e., less than 0.1%) of other components and/or impurities); (b) about 20% of a second low-melt alloy powder comprising 30.8–31.2% Cr, 25.8–26.2% Ta, 0.85–1.15% B, and the balance Ni (with only trace amounts (i.e., less than 0.1%) of other components and/or impurities); (c) about 10% of a third alloy powder comprising 5.9% Cr, 6.15–6.35% Al, 7.75–8.25% Co, 3.25–3.75% W, 1–1.5% Re, 4–4.5% Ta, 1–1.5% Nb, 0.4–0.6% Hf, 1.2–1.4% B, 2.75–3.25% Si, and the balance Ni (with only trace amounts (i.e., less than 0.1%) of other components and/or impurities); and (d) about 55% of a high-melt powder comprising 6.6–7% Cr, 5.9– 6% Al, 11.4–12.1% Co, 4.7–5.1% W, 1.3–1.7% Mo, 2.6–3% Re, 6.2–6.5% Ta, 1.3–1.7% Hf, and the balance Ni (with only trace amounts (i.e., less than 0.1%) of other components and/or impurities).

The braze repair alloy powder is made into a slurry using a commercially available binder, and is then applied to a clean surface of a Ni-based superalloy material and the component is heated in a vacuum to a braze temperatures of about 2300° F. for about 20 minutes.

Following brazing, a stepped diffusion heat cycle is used, as follows:

a. Heat to 1900° F. at 30° F. per minute and hold for 1 hour.
b. Heat to 2000° F. at 20° F. per minute and hold for 2 hours.
c. Heat to 2050° F. at 10° F. per minute and hold for 2 hours.
d. Heat to 2100° F. at 10° F. per minute and hold for 8 to 18 hours.
e. Cool to 1200° F. at a rate effective to avoid thermal distortion, and hold for at least 5 minutes.
f. Cool to 150° F. or less.

EXAMPLE 2
Stress Rupture Testing

Stress rupture (S/R) tests were performed on representative base metals, and on articles repaired using a preferred embodiment of the inventive powder mixture and repair process. In one aspect of the test, base metal materials such as MAR-M247 and CMSX-3 were subjected to heat treatments corresponding to the steps used in the present invention (e.g., heating to braze temperature, followed by a typical stepped heat diffusion cycle) to test the effect of the inventive method on the base materials themselves. The test conditions for the base metal tests were 1800° F. and 36 Ksi.

In another aspect of the S/R test, repaired parts were tested to determine the mechanical properties of parts repaired by the inventive process. The test conditions for repaired parts were 2000° F. and 5 Ksi for parts in which a 0.005-inch gap was repaired, and 2000° F. and 3 Ksi for parts in which a 0.040-inch gap was repaired.

The test results indicate that the braze repair process of the present invention does not cause any significant negative impact on the mechanical properties of the base metal, such as CMSX-3. Moreover, the repaired parts exhibited mechanical properties comparable to unrepaired superalloys such as MAR-M247.

For example, the average time to stress rupture for repaired parts that had a 0.005" gap (test at 2000° F. and 5 Ksi) was 46.98 hours for uncoated parts and 186.48 hours for parts coated with standard Pt/Al coatings. The time to rupture for coated 0.04"-gap parts was 153.34 hours (test at 2000° F. and 3 Ksi). This compares favorably to the performance of undamaged parts made from MAR-M247, whether uncoated or coated with standard Pt/Al coatings.

FIG. 1 shows the results of S/R testing. As can be seen from the graph, the mechanical performance of parts repaired by the compositions and methods of the present invention compares favorably with the mechanical performance of undamaged MAR-M247 parts.

EXAMPLE 3
Low Cycle Fatigue Testing

Low cycle fatigue (LCF) tests were performed on representative base metals, and on articles repaired using a preferred embodiment of the inventive powder mixture and repair process. For the low cycle fatigue (LCF) tests, the test conditions were 1900° F., R=0, 0.53% strain, and a frequency of 20 CPM for.

Figure 2:
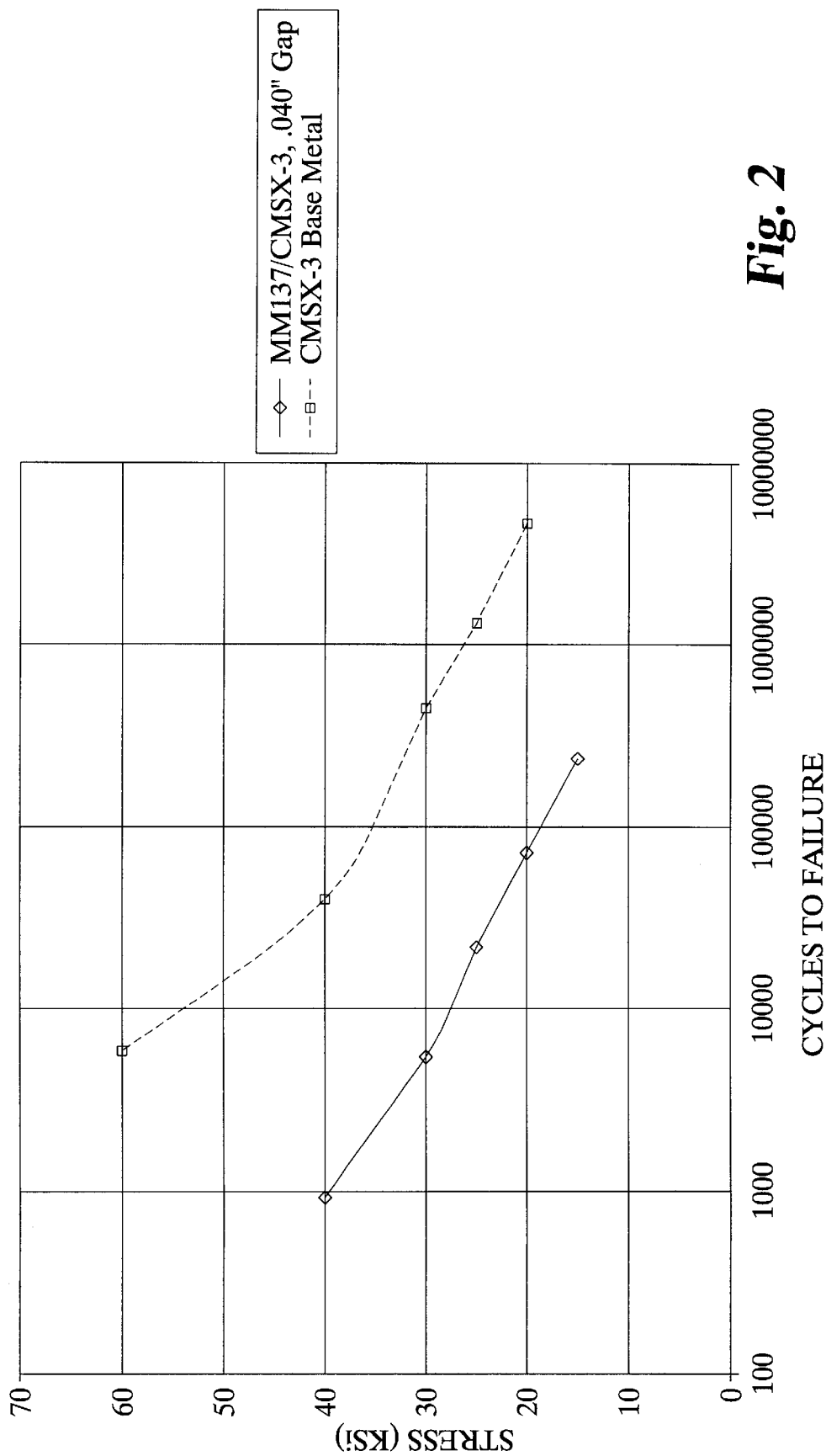
FIG. 2 is a graph showing the results of a low cycle fatigue test performed on an article repaired with the inventive braze repair alloy powders of one preferred embodiment of the present invention.

FIG. 2 shows the results of the LCF testing. As can be seen from the graph, the mechanical performance of parts repaired by the compositions and methods of the present invention compares favorably with the mechanical performance of undamaged MAR-M247 parts.

EXAMPLE 4
Cyclic Oxidation Testing

Cyclic oxidation tests were also performed on the brazed specimens using a cyclic oxidation test cycle of 2075° F. for 50 minutes and fan cool at room temperature for 10 minutes. The specimens consisted of base material and brazed samples, both with compatible PtAl coatings.

The inventive braze alloy mixtures performed much better than prior art braze mixtures during the tests. The most preferred embodiments achieved a more than 10-fold improvement of oxidation properties over diffusion braze alloy systems due to the lower percentage of boron and the higher percentage of aluminum.

Figure 3:
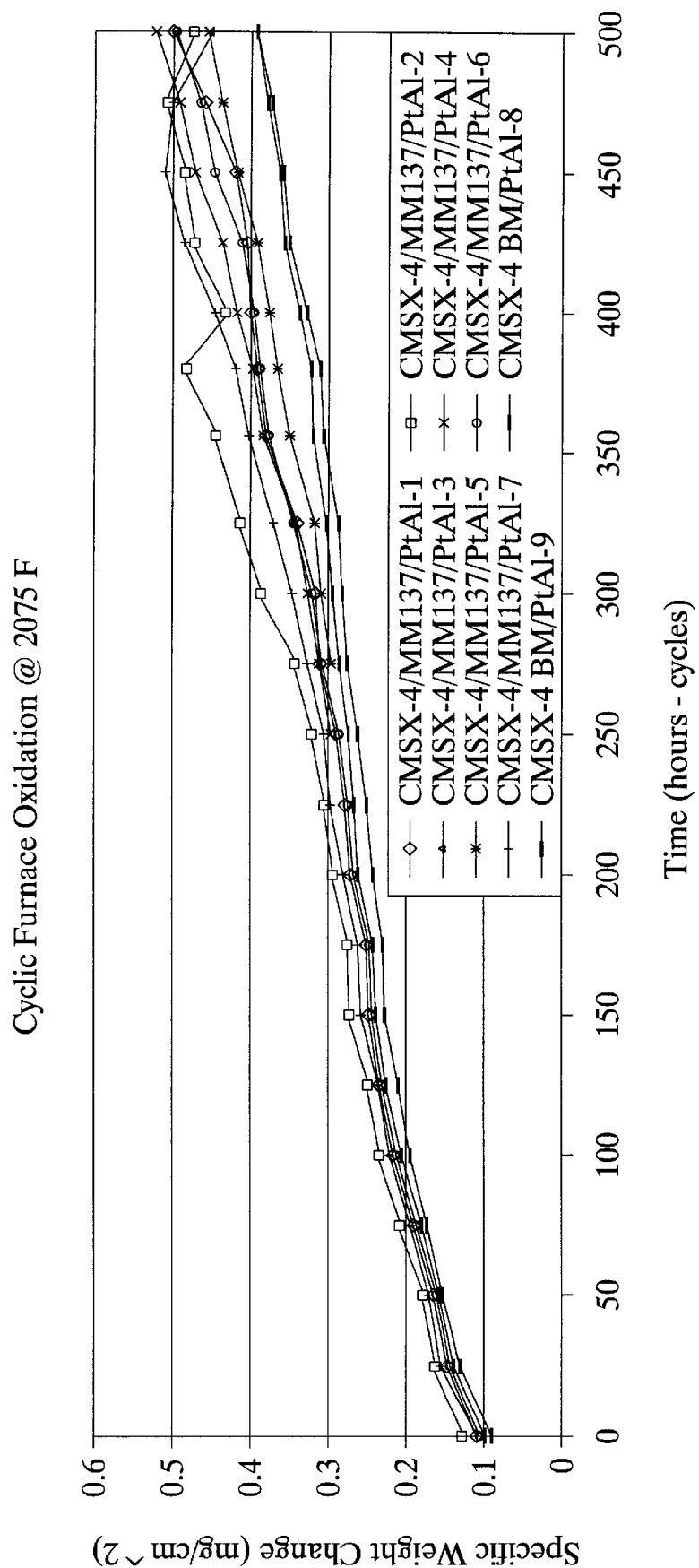
FIG. 3 is a graph showing the specific weight change during a cyclic furnace oxidation test performed on an article repaired with the inventive braze repair alloy powders of one preferred embodiment of the present invention.
Figure 4A:
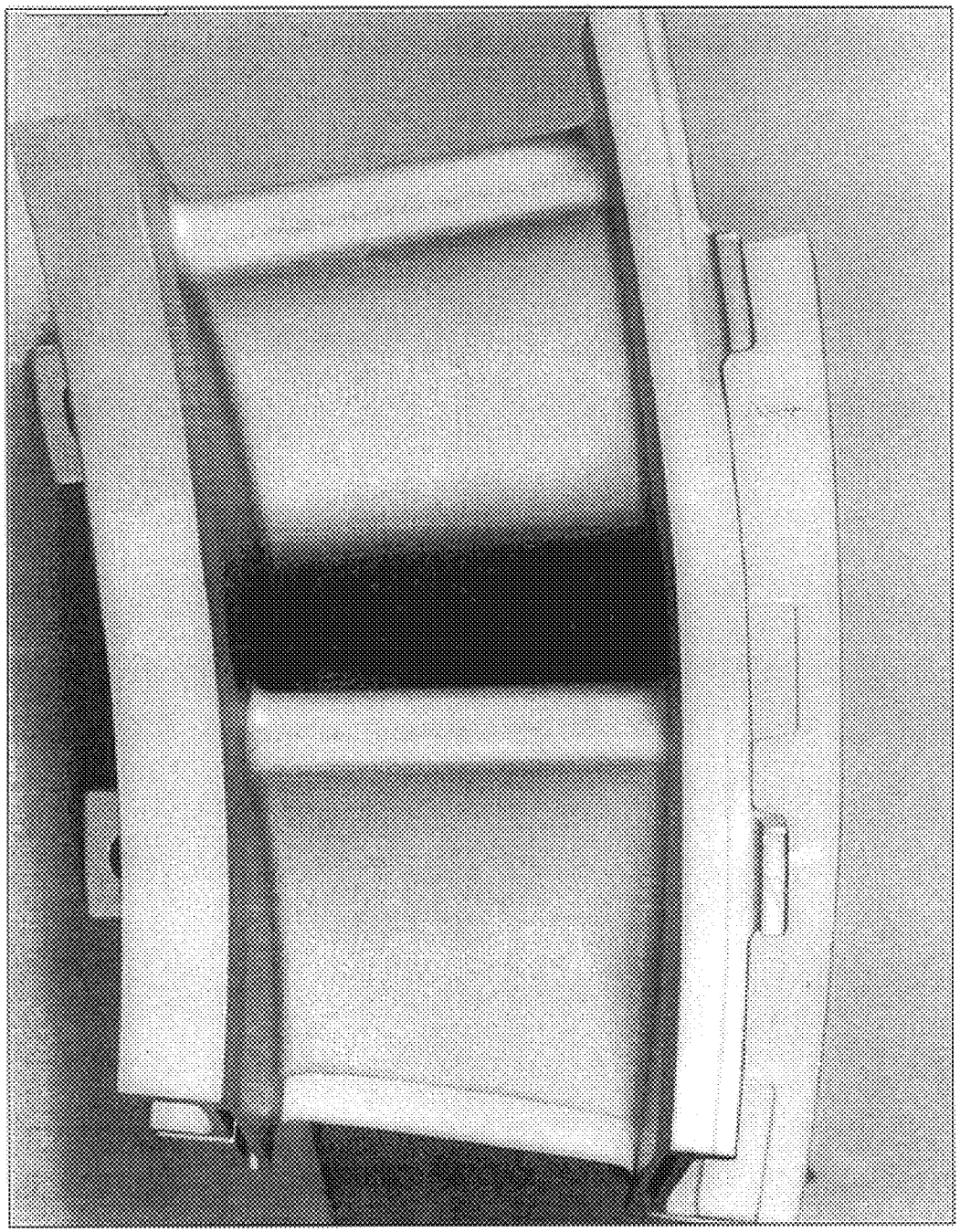
FIG. 4A shows an engine vane segment with fine cracks in the vane.
Figure 4B:
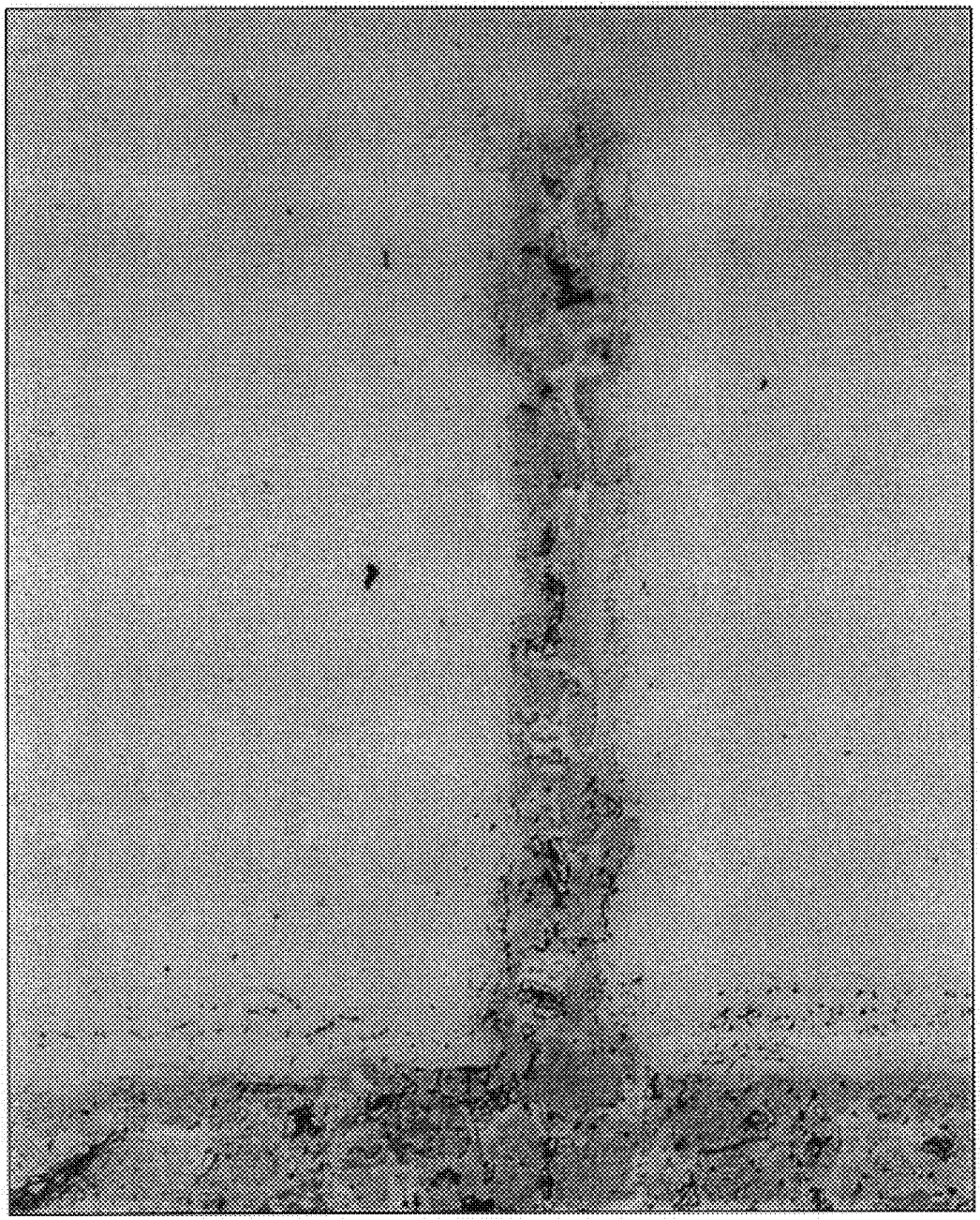
FIGS. 4B and 4C show cracks in an engine vane segment such as that shown in FIG. 4A, after repair with the inventive braze repair alloy powders of the present invention.
Figure 4C:
Figure 5A:
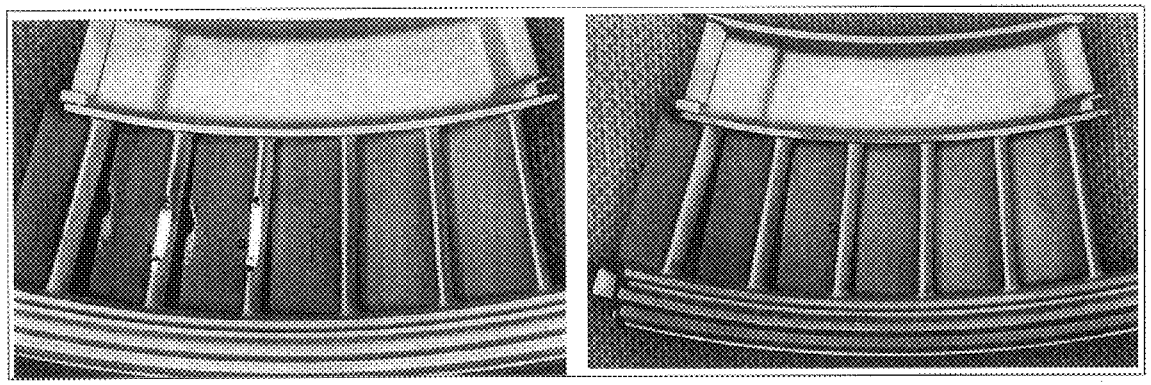
FIGS. 5A and 5B show leading and trailing edge sides of a vane segment prior to (5A) and after (5B) braze repair using the inventive braze repair alloy powders of the present invention.
Figure 5B:
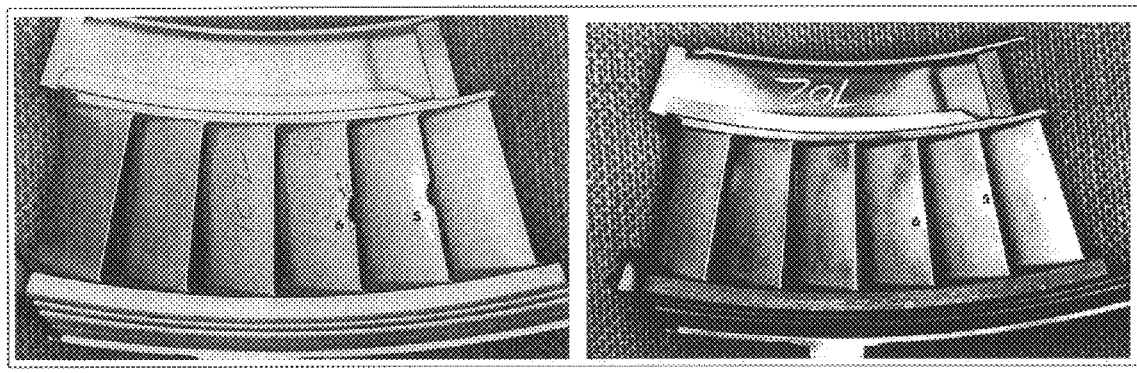

FIG. 3 shows the specific weight change during cyclic furnace oxidation test at 2075° F. for 500 cycles. (Five hundred cycles was selected to as a reasonable approximation of target engine flight life.) Sample weight changes were in weight gain or weight positive gain but decreasing weight. The samples gain weight due to the formation of protective oxides, which are primarily aluminum oxides. Some oxide spelling-off could result in reduction in weight. But protective layers still remain on the surface and Al can diffuse from the braze mixture to the surface to form new protective oxide. Negative weight gain is not desirable, and almost never occurred in the 500 cycle tests.

As shown by the above, it is to be appreciated that the microstructure of joints brazed with the technology of the present invention contains very few, if any, phases that would be detrimental to the joint mechanical and oxidation properties. The inventive mixtures also possess acceptable level of braze voids after brazing process.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A braze alloy powder composition comprising: (a) at least one low-melt alloy powder, and (b) at least one high-melt alloy powder; wherein said at least one low-melt alloy powder comprises 50–70% Ni, 8–20% Cr, 8–15% Ta, 4–10% Co, 2–7% Al, and up to 2.25% B, and wherein said at least one high-melt alloy powder comprises 50–70% Ni, 2–10% Cr, 2–10% Ta, 5–15% Co, 2–10% Al, 2–10% W, 2–4% Re, and up to 3% each of Mo and Hf.

2. A braze alloy powder composition according to claim 1 wherein said at least one low-melt alloy powder also comprises up to about 1% each of one or more members selected from the group consisting of: Ti, W, Mo, Re, Nb, Hf, Pd, Pt, Ir, Ru, C, Si, and Zr.

3. A braze alloy powder composition according to claim 1 wherein said at least one high-melt alloy powder also comprises up to about 1% each of one or more members selected from the group consisting of: Ti, Nb, C, B, Si, and Zr.

4. A braze alloy powder composition according to claim 1 wherein said at least one low-melt powder comprises about 57% Ni, about 17% Cr, about 12% Ta, about 6% Co, about 3.5% Al, and about 1.5% B.

5. A braze alloy powder composition according to claim 1 wherein said at least one low-melt powder comprises a mixture of three low-melt alloy powders, including: (a) about 35% of a first low-melt powder comprising about 74% Ni, about 6% Cr, about 6% Al, about 12% Co, and about 2% B; (b) about 45% of a second low-melt powder comprising about 42% Ni, about 31% Cr, about 26% Ta, and about 1% B; and (c) about 20% of a third low-melt powder comprising about 64% Ni, about 6% Al, about 8% Co, about 4% W, about 4% Ta, about 3% Si, about 1% Re, about 1% Nb, and about 1% B.

6. A braze alloy powder composition according to claim 1 wherein said at least one high-melt powder composition comprises about 58% Ni, about 7% Cr, about 6% Ta, about 12% Co, about 6% Al, about 3% Re, about 1.5% Hf, and about 5% W.

7. A braze alloy powder composition according to claim 1 wherein said composition comprises about 45% of said at least one low-melt alloy powder and about 55% of said at least one high-melt alloy powder.

8. A braze alloy powder composition according to claim 1 wherein said composition comprises about 45% of said at least one low-melt alloy powder and about 55% of said at least one high-melt alloy powder, wherein said at least one low-melt alloy powder comprises a mixture of three low-melt alloy powders, including: (a) about 35% of a first low-melt powder comprising about 74% Ni, about 6% Cr, about 6% Al, about 12% Co, and about 2% B; (b) about 45% of a second low-melt powder comprising about 42% Ni, about 31% Cr, about 26% Ta, and about 1% B; and (c) about 20% of a third low-melt powder comprising about 65% Ni, about 6% Al, about 8% Co, about 4% W, about 4% Ta, about 3% Si, about 0.5% to 1.5% each of Re, Nb, Hf, and B;

and wherein said at least one high-melt alloy powder comprises about 59% Ni, about 7% Cr, about 6% Ta, about 12% Co, about 6% Al, about 3% Re, about 1.5% Hf, and about 5% W.

9. A braze alloy powder composition according to claim 1, wherein the overall composition comprises 50–70% Ni, 10–15% Cr, 8–10% Ta, 8–10% Co, 4–6% Al, 2–4% W, and about 1% each of Mo, Re, and Hf.

10. A braze alloy powder composition according to claim 9 consisting essentially of about 58% Ni, about 11% Cr, about 9% Ta, about 9% Co, about 5% Al, about 3% W, and about 1% each of Mo, Re, and Hf.

11. A braze alloy mixture according to claim 9 wherein said mixture also comprises up to about 1% each of one or more members selected from the group consisting of: Ti, Nb, Pd, Pt, Ir, Ru, C, Si, B, and Zr.

12. A method of repairing an article made of a nickel-based superalloy material, said method comprising:
(a) providing a braze alloy powder composition comprising:
(i) at least one low-melt alloy powder, and
(ii) at least one high-melt alloy powder; wherein said at least one low-melt alloy powder comprises 50–70% Ni, 8–20% Cr, 8–15% Ta, 4–10% Co, 2–7% Al, and up to 2.25% B; and wherein said at least one high-melt alloy powder comprises 50–70% Ni, 2–10% Cr, 2–10% Ta, 5–15% Co, 2–10% Al, 2–10% W, 2–4% Re, and up to 3% each of Mo and Hf;
(b) brazing a damaged portion of the article with said braze alloy powder composition, wherein said brazing is done at temperatures of between about 2150° F. and about 2350° F.

13. The method of claim 12 and further comprising the step of exposing the brazed article to a stepped diffusion cycle at temperatures of between about 1900° F. and about 2100° F.

14. The method of claim 12 wherein said providing step comprises providing a braze alloy powder composition comprising about 45% of at least one low-melt alloy powder and about 55% of at least one high-melt alloy powder, wherein said at least one low-melt alloy powder comprises a mixture of three low-melt alloy powders, including: (a) about 35% of a first low-melt powder comprising about 74% Ni, about 6% Cr, about 6% Al, about 12% Co, and about 2% B; (b) about 45% of a second low-melt powder comprising about 42% Ni, about 31% Cr, about 26% Ta, and about 1% B; and (c) about 20% of a third low-melt powder comprising about 64% Ni, about 6% Al, about 8% Co, about 4% W, about 4% Ta, about 3% Si, about 1% Re, about 1% Nb, and about 1% B, and said high-melt alloy powder comprises about 58% Ni, about 7% Cr, about 6% Ta, about 12% Co, about 6% Al, 2–4% Re, 1–2% Hf, and about 5% W.

15. The method of claim 14 and further including the step of exposing the brazed article to a stepped diffusion cycle as follows:

a. Heat part to 1800–2000° F. and hold for 0.5–4 hours;
   b. Heat part to 1900–2100° F. and hold for 1–4 hours;
   c. Heat part to 1950–2150° F. and hold for 1–4 hours;
   d. Heat part to 2000–2200° F. and hold for 6 to 24 hours; and
   e. Cool to ambient temperature.

16. The method of claim 15 wherein the heating is accomplished at a rate such that the first heating step is performed at a rate of about 20–40° F. per minute, the second heating step is performed at a rate of about 10–30° F. per minute, the third heating step is performed at a rate of about 5–20° F. per minute, the fourth heating step is performed at a rate of about 5–20° F. per minute.

17. The method of claim 15 wherein said stepped diffusion cycles is as follows:

a. Heat to 1900° F. at 30° F. per minute and hold for 1 hour;
   b. Heat to 2000° F. at 20° F. per minute and hold for 2 hours;
   c. Heat to 2050° F. at 10° F. per minute and hold for 2 hours;
   d. Heat to 2100° F. at 10° F. per minute and hold for 8 to 18 hours;
   e. Cool at a rate effective to avoid thermal distortion.

* * * * *

UNITED STATES PATENT AND TRADEMARK OFFICE
CERTIFICATE OF CORRECTION

PATENT NO. : 6,454,885 B1
DATED : September 24, 2002
INVENTOR(S) : Chesnes et al.

It is certified that error appears in the above-identified patent and that said Letters Patent is hereby corrected as shown below:

Columns 5 and 6,
Table 1 under Alloy N, ADB-02: delete ".0330 max", insert -- .0300 max --
Table 2, BRAZE ALLOY COMPOSITIONS delete Table 2 and insert the correct table shown below:

TABLE 2. BRAZE ALLOY COMPOSITIONS
by weight percent

[Table image of braze alloy compositions]

Signed and Sealed this

Fourth Day of February, 2003

JAMES E. ROGAN
*Director of the United States Patent and Trademark Office*